No. 875,289.
PATENTED DEC. 31, 1907.
A. C. ROWE.
BUCKET AND TANK FIRE EXTINGUISHER SYSTEM.
APPLICATION FILED FEB. 13, 1907.
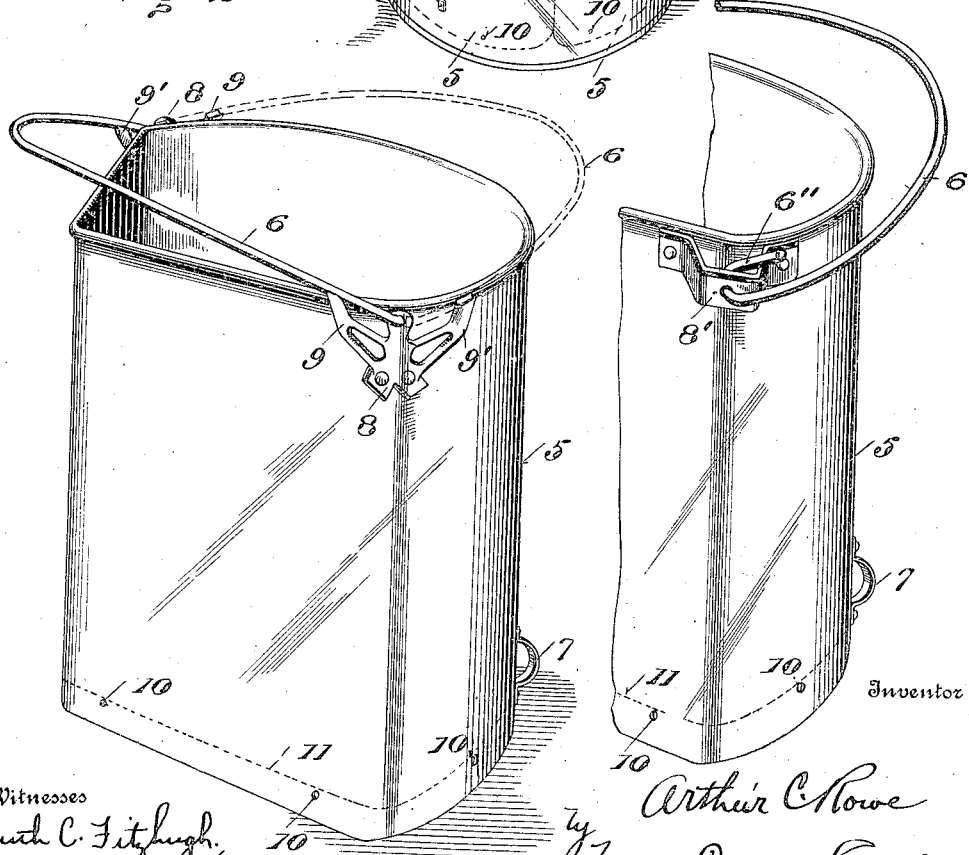

UNITED STATES PATENT OFFICE.

ARTHUR C. ROWE, OF NEW YORK, N. Y.

BUCKET-AND-TANK FIRE-EXTINGUISHER SYSTEM.

No. 875,289.　　Specification of Letters Patent.　　Patented Dec. 31, 1907.

Application filed February 13, 1907. Serial No. 357,228.

*To all whom it may concern:*

Be it known that I, ARTHUR C. ROWE, a citizen of the United States of America, and a resident of New York city, New York, have invented a new and useful Improvement in Bucket-and-Tank Fire-Extinguisher Systems, which improvement is fully set forth in the following specification.

The object of this invention is to provide a plurality of buckets for use in extinguishing fire, to have them kept filled (with water or other suitable liquid), to protect against evaporation of the liquid, to prevent use otherwise than in case of fire, to insure that the handle of each bucket shall be in a position to be readily grasped when necessary, and that the handle shall not become rusted or corroded to the bucket (or the buckets corroded to each other), to sustain the handle of each bucket in such manner as to facilitate the throwing of its contents with efficiency, and for other purposes.

The invention will be best understood by reference to the accompanying drawings that illustrate preferred embodiments.

In these drawings, Figure 1 is a perspective of a tank containing the buckets; Fig. 2 is a perspective of one of the buckets; while Fig. 3 is a detail.

1 is a tank containing a plurality of tiers (shown as two), each tier consisting of a plurality of buckets (shown as three).

2 is a hinged cover for the tank, having an ordinary hasp 3 with a handle 4, and adapted to engage over a suitable catch on the tank.

The buckets 5 are of uniform height and of similar shape. They are shown as having vertical side walls, and are of such shape that when arranged together they will form a compact outline (shown as cylindrical). As shown, each bucket consists of two flat sides inclosing an angle of about 120°, while the third side is 120° of the arc of a circle whose center is at the meeting edges of the two flat sides. Of course, if four buckets were employed, the flat sides of each body would meet at an angle of about 90° and the third side would be 90° of the arc of a circle, or a quadrant, and so on; but three is the preferred number. The (cylindrical) outline formed by the buckets when brought together, is considerably less than the diameter of the tank 1, so that when the buckets are in place there is an annular space between the outside of the assembled buckets and the wall of the tank. Within this space lie the handles or bails 6 of the buckets.

In order that the buckets may be properly positioned at the proper distance from the wall of the tank, I provide on each bucket a plurality of spacing-devices. In the drawings these are shown as three; one of them, as 7, is located in the middle of the curved side of the bucket, near the bottom; the other two, 8—8, are located at the two opposite upper corners of the bucket, being in fact a part of the brackets that constitute the hinges for the bails 6. When the buckets are put in position in the tank, these (three) spacing-devices constitute projections extending beyond the surfaces of the sides of the bucket and insure that each bucket will be in its proper position. Moreover, if two out of the (say) three buckets constituting one tier, be removed, the remaining bucket will not topple over because it remains standing upon an even bottom,—since the buckets in the tier (or tiers) below it are of uniform height to present a level rest, while the bucket itself has (three) fixed points for determining its position. The brackets 8—8 serve not only as hinges for the bails 6, and as spacing-devices for the buckets, but also serve as stops to hold the bails in the proper position. The arms 9—9' projecting from each bracket rise to such height as to hold the bail 6 a few inches above the level of the top of the bucket. The bails are of such size as to extend a few inches beyond the periphery of the bucket.

Each bucket may be filled separately and inserted in place in the tank; or the tank and the buckets may be filled. In the latter case, I provide holes 10 for emptying any air trapped in the space beneath the floor 11 of the bucket, which is shown as lying somewhat above the bottom of the side-walls.

When it is desired to use the buckets, all the attendant has to do is to raise the lid 2 of the tank and grasp the handle or bail 6 that extends conveniently before him; on lifting the bucket he will seize it with the other hand beneath the device 7; and, on bringing his hands toward each other, the bail 6 comes against the arms 9, whereupon he can toss the contents of the pail to a considerable distance and with a great certainty of aim. The angle formed between the two flat sides constitutes a spout. The fact that for the time being the bail is practically rigid with the bucket lends certainty to the aim of the attendant; and the resiliency of the bail increases the range of the discharge.

Fig. 3 shows a modified form of bracket for the bail 6. This bracket 8' is secured at each end to the body of the bucket 5, while its central portion is spaced a little from the bracket, being substantially U-shaped when viewed from above. The bail 6 has its end pivoted in this central portion, and is bent back parallel with itself, at 6''. This latter portion rests upon the adjacent edge of the bracket, so that resiliency of the entire length of the bail 6 is availed of.

I have described my invention with some particularity of detail, but solely for the sake of clearness, since changes may be made in the construction and arrangement of the parts without departing from the spirit of my invention. For instance, the curved sides of the buckets are shown as vertical, but they might flare outwardly more or less, or the wall of the tank might be made flaring, or both parts might flare. Likewise, the buckets when assembled, or the tank, or both, may constitute a polygonal prism instead of a cylinder, or a truncated polygonal pyramid.

The spirit of my invention consists in having the buckets so shaped that they can be assembled together in a compact form without any waste space between them, so as to fit within the tank; in having them of uniform height, so that the buckets constituting one tier will present a level rest for the second tier; further, in providing a free space between the tank and the periphery of the assembled buckets; and in providing spacing-devices for holding the handles in the position indicated.

Having thus described my invention, I claim:

1. In a bucket-and-tank fire-extinguisher system, the combination of a cylindrical tank, a plurality of complementary buckets having two straight walls and assembled in said tank in a plurality of tiers, so as to produce a cylinder of less diameter than the tank, a plurality of spacing-devices on each bucket and abutting against the wall of the tank, a bail upon each bucket, and means for holding each bail elevated above the top thereof.

2. The combination of a tank, a plurality of buckets of complementary shape that when assembled side by side constitute a figure of less size than the corresponding part of the tank, a plurality of spacing-devices on each bucket adapted to abut against the wall of the tank, a pivoted bail carried by each bucket, and means for holding the same above the top of the bucket.

3. A bucket, designed for use in a bucket-and-tank fire-extinguisher system, having two flat sides and a third side in the form of a portion of a cylinder, a plurality of spacing-devices thereon projecting beyond the surfaces of the sides, a pivoted bail, and stops for holding said bail elevated above the top of the bucket.

4. A bucket, designed for use in a bucket-and-tank fire-extinguisher system, having a plurality of flat vertical sides, a plurality of spacing-devices projecting beyond the surfaces of the sides, a pivoted bail, and stops for holding said bail elevated above the top of the bucket.

5. In a bucket-and-tank fire extinguisher system, the combination of a tank and a plurality of buckets assembled close together therein to conform to the shape of the tank, a uniform space between the outside of the assembled buckets and the wall of the tank, spacing-devices on each bucket abutting against the tank, a pivoted bail on each bucket, and means for holding the same elevated.

6. In a bucket-and-tank fire-extinguisher system, the combination of a tank and a plurality of buckets having each at least two flat vertical sides and adapted to be assembled into a compact form, a plurality of spacing-devices on each bucket adapted to abut against said tank, and on each bucket a handle and means for holding it above the top of its bucket.

7. The combination of a fire-bucket, having ears rigidly and immovably secured thereto and comprising a horizontal seat or pivot-bearing and relatively-immovable bearings laterally adjacent thereto, of a bail having inturned ends resting in said horizontal bearings, the parts being so adjusted that when the bail is lowered its inturned ends will rest upon said horizontal bearings and said bail will not descend below the top of said bucket.

In testimony whereof I have signed this specification in the presence of two subscribing witnesses.

ARTHUR C. ROWE.

Witnesses:
C. A. L. MASSIE,
RALPH L. SCOTT.